United States Patent
Xu et al.

(10) Patent No.: US 12,149,355 B2
(45) Date of Patent: Nov. 19, 2024

(54) INFORMATION TRANSMISSION METHOD AND APPARATUS

(71) Applicant: ZTE CORPORATION, Guangdong (CN)

(72) Inventors: Hui Xu, Guangdong (CN); Chen Lu, Guangdong (CN); Fengwei Wang, Guangdong (CN); Xiangmo Zhao, Guangdong (CN); Fei Hui, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 381 days.

(21) Appl. No.: 17/611,238

(22) PCT Filed: May 28, 2020

(86) PCT No.: PCT/CN2020/092857
§ 371 (c)(1),
(2) Date: Nov. 15, 2021

(87) PCT Pub. No.: WO2020/244438
PCT Pub. Date: Dec. 10, 2020

(65) Prior Publication Data
US 2022/0216945 A1    Jul. 7, 2022

(30) Foreign Application Priority Data
Jun. 5, 2019 (CN) .......................... 201910488431.X

(51) Int. Cl.
*H04L 1/08* (2006.01)
*H04L 1/1812* (2023.01)
(Continued)

(52) U.S. Cl.
CPC .............. *H04L 1/08* (2013.01); *H04L 1/1812* (2013.01); *H04L 5/0053* (2013.01); *H04W 4/40* (2018.02); *H04W 92/18* (2013.01)

(58) Field of Classification Search
CPC ....... H04L 1/08; H04L 1/1812; H04L 5/0053; H04L 2001/0093; H04L 1/1825;
(Continued)

(56) References Cited

U.S. PATENT DOCUMENTS

2020/0092692 A1 * 3/2020 Wang ..................... H04W 76/14
2020/0195389 A1 * 6/2020 Basu Mallick ....... H04L 1/1887
2021/0321380 A1   10/2021 Zhao

FOREIGN PATENT DOCUMENTS

CN    110880961     *  9/2018   ........... H04L 5/0053
CN    109792594 A      5/2019
(Continued)

OTHER PUBLICATIONS

WIPO, International Search Report issued on Jul. 14, 2020.
(Continued)

*Primary Examiner* — Chi H Pham
*Assistant Examiner* — Raul Rivas
(74) *Attorney, Agent, or Firm* — Li & Cai Intellectual Property (USA) Office

(57) ABSTRACT

The present disclosure provides an information transmission method and apparatus, a storage medium and an electronic apparatus. The method includes: confirming, by a transmitting terminal, activation/deactivation of PC5 HARQ retransmission; and retransmitting, by the transmitting terminal according to negative acknowledgement response information from a receiving terminal, V2X service data to the receiving terminal over PC5.

14 Claims, 7 Drawing Sheets

A transmitting terminal confirms activation/deactivation of PC5 HARQ retransmission — S302

The transmitting terminal, according to Nack response information from a receiving terminal, retransmits V2X service data to the receiving terminal over PC5 — S304

(51) Int. Cl.
*H04L 5/00* (2006.01)
*H04W 4/40* (2018.01)
*H04W 92/18* (2009.01)

(58) Field of Classification Search
CPC ... H04L 1/1893; H04L 1/1896; H04L 1/1854; H04L 1/1806; H04W 4/40; H04W 92/18
See application file for complete search history.

(56) References Cited

FOREIGN PATENT DOCUMENTS

| | | | | |
|---|---|---|---|---|
| CN | 111082900 | A | 4/2020 | |
| EP | 3282618 | A1 * | 2/2018 | ............... H04L 1/08 |
| KR | 20200050820 | * | 11/2018 | ........... H04L 5/0094 |
| WO | WO 2018171540 | A1 | 9/2018 | |
| WO | WO 2018174611 | A1 | 9/2018 | |
| WO | WO 2019070332 | A1 | 4/2019 | |

OTHER PUBLICATIONS

Huawei, Hisilicon. "Sidelink physical layer procedures for NR V2X," 3GPP TSG RAN WG1 Meeting #96bis, Xi'an, China, Apr. 2, 2019.
CATT. "HARQ Procedure for Mode 1," 3GPP TSG-RAN WG2 Meeting #105, Athens, Greece, Feb. 15, 2019.
China Patent Office, CN201910488431.X First Office Action issued on Dec. 22, 2022.
European Patent Office, EP20818609.8 Extended European Search Report issued on Dec. 19, 2022.
Mediatek Inc, "NR sidelink mode-1 resource allocation", 3GPP Draft, May 13, 2019.

* cited by examiner

INFORMATION TRANSMISSION METHOD AND APPARATUS

CROSS-REFERENCE TO RELATED APPLICATIONS

This is a National Phase Application filed under 35 U.S.C. 371 as a national stage of PCT/CN2020/092857, filed on May 28, 2020, an application claiming the priority of Chinese Patent Application No. 201910488431 X, filed on Jun. 5, 2019, the contents of which are incorporated herein in their entirety by reference.

TECHNICAL FIELD

The present disclosure relates to, but is not limited to, the field of communications.

BACKGROUND

With the rapid development of economy and society, the car ownership is rapidly increased, and road traffic accidents frequently occur, which has become one of the most important factors influencing public safety in recent years, and the problem of road traffic safety has become one of the basic problems influencing social harmony and improvement of people's livelihood. Improvement in the safety design of vehicles is an important component.

The communication-based collision warning system has becomes a new idea for solving the road traffic safety problem across the globe. Utilizing an advanced wireless communication technology and a new generation information processing technology, the collision warning system realizes real-time information interaction between vehicles and between a vehicle and road side infrastructures, so that each party is notified of the current states (including the location, the speed, the acceleration and the travel path of the vehicle), information on the road environment is acquired, a road danger condition can be cooperatively sensed, various collision warning information can be provided in time, and thus road traffic safety accidents can be avoided.

SUMMARY

According to an embodiment of the disclosure, there is provided an information transmission method, including: confirming, by a transmitting terminal, activation/deactivation of PC5 Hybrid Automatic Repeat reQuest (HARQ) retransmission; and retransmitting, by the transmitting terminal according to negative acknowledgement response information from a receiving terminal, Vehicle to Everything (V2X) service data to the receiving terminal over PC5.

According to another embodiment of the disclosure, there is provided an information transmission apparatus, including: a confirmation module configured to confirm activation/deactivation of PC5 HARQ retransmission; and a retransmission module configured to retransmit, according to negative acknowledgement response information from a receiving terminal, V2X service data to the receiving terminal over PC5.

According to still another embodiment of the disclosure, there is further provided a storage medium having a computer program stored thereon, the computer program, when executed by a processor, causing the processor to perform the information transmission method according to the present disclosure.

According to still another embodiment of the disclosure, there is further provided an electronic apparatus, including a memory and a processor. The memory has a computer program stored thereon, and the processor, when executing the computer program, executes the information transmission method according to the present disclosure.

BRIEF DESCRIPTION OF DRAWINGS

The drawings described herein are intended to provide a further understanding of the present disclosure, and are intended to be a part of the present disclosure. The exemplary embodiments of the present disclosure and the description thereof are for explaining the present disclosure and do not constitute an undue limitation of the present disclosure. In the drawings.

DETAIL DESCRIPTION OF EMBODIMENTS

The disclosure will be described in detail below with reference to the drawings in conjunction with the embodiments. It should be noted that embodiments of the disclosure and features therein may be combined with each other in any manner as long as they are not contradictory.

It should be also noted that terms "first", "second", and the like in the description, claims and drawings of the disclosure are used for the purpose of distinguishing similar objects instead of indicating a specific order or sequence.

The Vehicle to Everything (V2X) refers to a technology that provides vehicle information through onboard sensors, onboard terminals and electronic tags, implements Vehicle to Vehicle (V2V), Vehicle to Pedestrian (V2P) and Vehicle to Infrastructure (V2I) interconnection and intercommunication with various communication technologies, and extracts and shares or uses in other manners information on an information network platform, thereby effectively managing and controlling vehicles and providing comprehensive services.

Figure 1:
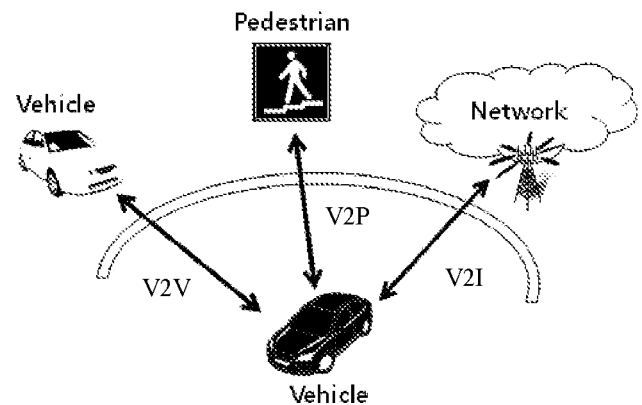
FIG. 1 is a schematic diagram of V2X in the related art.

FIG. 1 shows a schematic diagram of V2X.

With the development of new mobile communication technologies in recent years, Long Term Evolution (LTE) and 5G NR (New Radio) have been proposed for the research of applications based on V2X communication.

A Road Side Unit (RSU), which is capable of receiving a vehicle request and ensuring access of the vehicle to the Internet, has a gateway function. In addition, the RSU further has data computation, storage, and transfer functions.

There are currently two techniques for implementation of V2X: Dedicated Short Range Communication (DSRC) and cellular network V2X. DSRC is based on IEEE 802.11P and IEEE 1609 series standards. 802.11P is responsible for the physical layer and Media Access Control (MAC) technology, while 1609 is responsible for upper layer specifications. Discussion about the cellular network 5G NR based V2X technology has been just initiated and no standard has been achieved yet.

The NR V2X technology currently under discussion by 3GPP includes: V2X that may be implemented over a PC5 interface or Uu interface. The PC5 interface refers to a Device to Device (D2D) air interface. The Uu interface refers to a User Equipment (UE) to gNB air interface.

Figure 2:
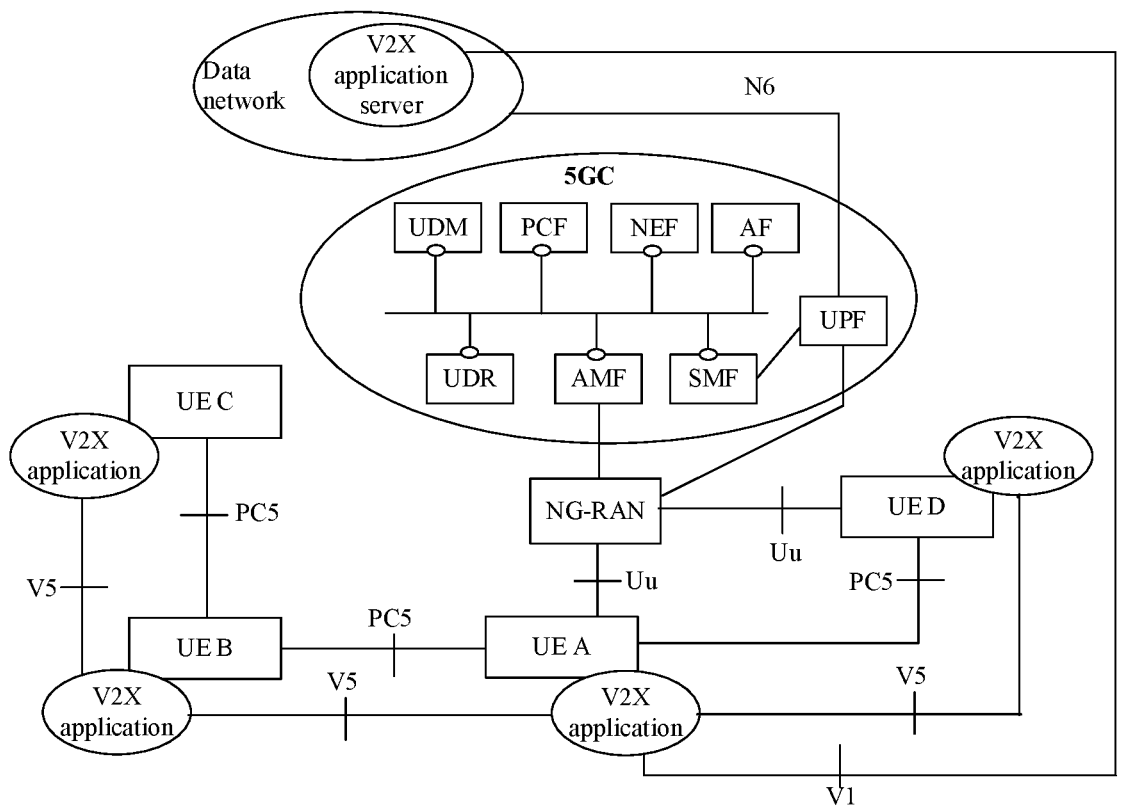
FIG. 2 is a schematic diagram of an architecture in which a V2X service is transmitted over a PC5 interface according to the related art.

The architecture of the system for sending a V2X service over a PC5 interface is shown in FIG. 2.

NR V2X supports unicast, groupcast and broadcast transmissions, all three of which may be implemented in-coverage, in-partial-coverage or out-of-coverage. The NR V2X transmission mode includes mode1 and mode2. The mode1 refers to a mode in which the gNB configures the PC5 resource for transmitting the V2X service, and the mode2 refers to a mode in which the UE autonomously selects the PC5 resource for transmitting the V2X service.

In NR V2X, the highest reliability requirement is 99.999%, the minimum delay requirement is 3 ms, and NR V2X adopts retransmission at the PC5 interface to solve the reliability problem. In order to realize transmission, the receiving UE is for sending a response signal to the transmitting UE. The response signal is configured to indicate whether the V2X message is correctly received and decoded, and the transmitting UE may retransmit the V2X message according to the indication of the response signal. In order to transmit the response signal, a dedicated physical channel, i.e., a Physical Sidelink Feedback Channel (PSFCH), is designed.

In the NR V2X topic under study by 3GPP, HARQ retransmission is used to improve reliability of the V2X service, but the implementation scheme for HARQ retransmission has not been determined yet. For example, there is no conclusion about how to activate/deactivate HARQ retransmission, and how to determine the resource for HARQ retransmission.

The apparatus in which methods according to embodiments of the present disclosure are operated is described below. In the embodiments of the present disclosure, the inventive apparatus mainly includes a terminal device and an access network device.

In an embodiment of the present disclosure, the terminal device may include at least one of: an On Board Unit (OBU), a Road Side Unit (RSU), a User Equipment (UE), a V-UE, a P-UE, a wearable device (Wearables), a UE-to-network relay, and an Internet of Things/Manual Toll Collection (IoT/MTC) terminal. Unless otherwise specified, the UE in embodiments of the present disclosure represents any one or more of the above terminal devices.

For convenience of description, V-UE in the embodiments of the present disclosure refers to Vehicle-UE, and P-UE refers to Pedestrian-UE. PC5 and SideLink have the same meaning, both indicating an air interface link between UEs.

The terminal device determines whether to activate/deactivate PC5 HARQ retransmission according to an instruction from a gNB or pre-configured rules. When determining to activate the PC5 HARQ retransmission, the UE selects initial transmission resource and retransmission resource configured by the gNB or autonomously, and determines whether to send the retransmission data according to the received PSFCH signal.

The access network device is a base station, including one of: an eNB and a gNB. The access network device is mainly responsible for: configuring PSFCH resource and HARQ retransmission resource for the terminal device, and instructing the terminal device to activate/deactivate HARQ retransmission.

Figure 3:
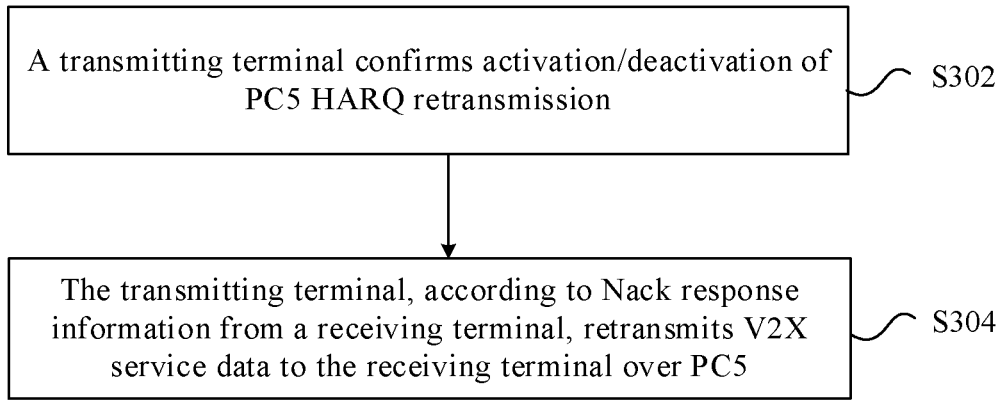
FIG. 3 is a flowchart of an information transmission method according to an embodiment of the present disclosure.

In this embodiment, there is provided an information transmission method operated in the above apparatus. FIG. 3 is a flowchart of an information transmission method according to an embodiment of the present disclosure. As shown in FIG. 3, the flow includes the following steps S302 to S304.

At step S302, a transmitting terminal confirms activation/deactivation of PC5 HARQ retransmission.

At step S304, the transmitting terminal, according to negative acknowledgement response information from a receiving terminal, retransmits V2X service data to the receiving terminal over PC5.

In this embodiment, the activation/deactivation of HARQ retransmission may be configured by a base station or may be pre-configured. Being configured by the base station means that the transmitting UE sends indication information to the base station, and the base station configures activation/deactivation of the retransmission according to the indication information. The indication information includes a V2X service attribute (including a delay requirement, a reliability requirement, etc.) and a PC5 link state. The PC5 link state includes a link quality, a congestion level, etc. The link quality may be obtained by measuring reference signals transmitted on the PC5 channel. For example, the link quality of the PC5 interface is a measurement result of a DeModulation Reference Signal (DMRS) of the PC5 interface. The congestion level may be represented by a Channel Busy Rate (CBR). For example, if the V2X service requires high reliability but the PC5 link quality is poor, the base station activates HARQ retransmission.

In this embodiment, the response information includes one of: acknowledgement and negative acknowledgement. Upon receiving a negative acknowledgement response, the transmitting UE sends a request message for PC5 retransmission resource to the base station.

In an embodiment, in order to reduce processing delay, when retransmission is activated, the retransmission resource (including the number of retransmissions) may be configured by the base station and notified to the transmitting UE at the initial transmission, or may be reserved by the receiving UE, and then notified to the receiving UE by the transmitting UE. Upon receiving a negative acknowledgement response signal, the transmitting UE retransmits the V2X data; and upon receiving an acknowledgement response signal, the retransmission resource may be used by other UEs.

In this embodiment, the PC5 communication includes an intra-frequency mode and an inter-frequency mode. The intra-frequency mode refers to that Uu and PC5 share the same frequency; and the inter-frequency mode refers to that the PC5 communication adopts a dedicated frequency, such as a V2X frequency of 5.9 GHz.

In an embodiment of the present disclosure, the PC5 refers to an interface between UEs, and may also be represented by other names (e.g., SideLink). The PC5 interface may adopt a Prose technique for a licensed or unlicensed spectrum.

Figure 4:
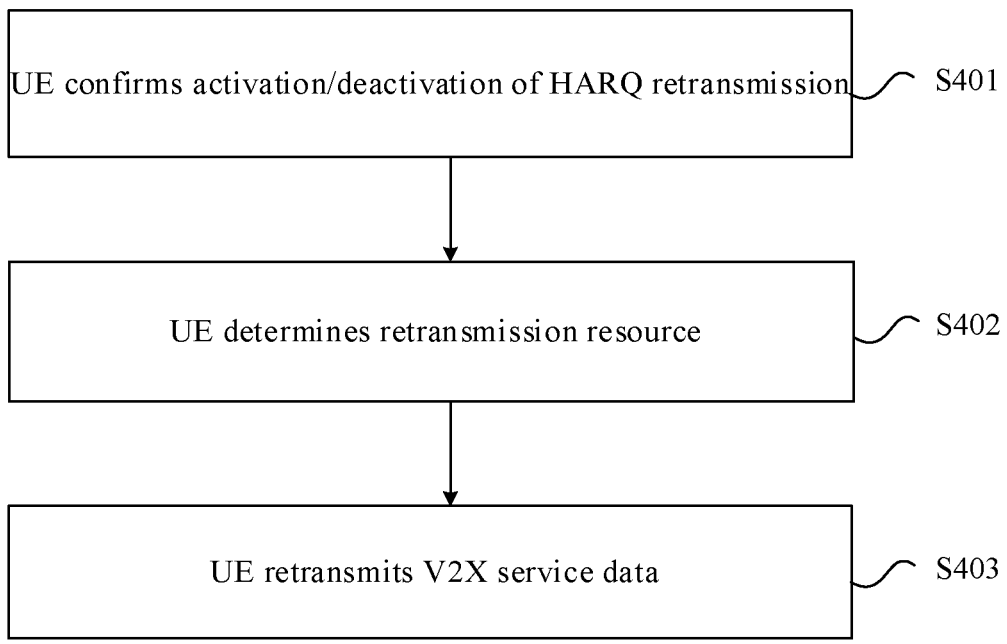
FIG. 4 is a flowchart of an information transmission method according to an embodiment of the present disclosure.

The following describes the retransmission scheme provided by the present disclosure in further detail taking the example of UE as the terminal device. As shown in FIG. 4, it mainly includes the following steps S401 to S403.

At step S401, the UE confirms activation/deactivation of HARQ retransmission.

The UE may be in mode1 or mode2. For a UE in mode1, firstly, determine whether to activate the retransmission according to at least one of a Quality of Service (QoS) attribute of an upper layer V2X service, a PC5 link state, and a retransmission activation state. The QoS attribute of the V2X service include at least one of: delay, reliability and a communication distance. The PC5 link state is configured to indicate a PC5 link quality or congestion level. The retransmission activation state may include: activated or inactivated. If the current activation state is activated, the UE judges whether to remain activated or to deactivate the retransmission; otherwise, the UE judges whether to activate the retransmission. For example: when the V2X service has high reliability requirement, the PC5 link quality is poor and retransmission is not activated, the UE preliminarily confirms that retransmission needs to be activated.

Secondly, the UE sends indication information to the gNB to indicate a request for activating the PC5 retransmission. The indication information may be transmitted through PUCCH/PUSCH, and may be carried in a Scheduling Request (SR), a Buffer Status Report (BSR), Acknowledgement (Ack)/Negative Acknowledgement (Nack), or the like.

Thirdly, the gNB comprehensively determines whether to activate the retransmission according to the received indication information, the network state, the operator strategy and the like. If the retransmission is determined to be activated, the gNB sends retransmission activate indication information to the UE; otherwise, the gNB sends retransmission deactivate (inactivate) indication information to the UE. The gNB may instruct the UE to activate the retransmission by one of: physical layer Downlink Control Information (DCI) signaling, Media Access Control (MAC) Control Element (CE) signaling, or Radio Resource Control (RRC) signaling.

It should be noted that even if the request message from the UE is not received by the gNB, the gNB may still determine to activate/deactivate the PC5 retransmission and notify the UE which is in an RRC-Connected mode.

For a UE in mode2, the UE determines whether to activate/deactivate PC5 retransmission with pre-configured rules. The pre-configured rules are stored internally in the UE and include QoS threshold for the V2X service and/or threshold for the PC5 link state. For example, the UE may determine to activate the retransmission when the reliability requirement of the V2X service exceeds the QoS threshold and/or the PC5 link quality is below the link state threshold.

After the UE confirms activation/deactivation of the retransmission, indication information for activating/deactivating the retransmission needs to be sent to the receiving UE over PC5.

At step S402, the UE determines the retransmission resource.

The UE may be in mode1 or mode2. For a UE in mode1, the UE requests retransmission resource from the gNB which configures PC5 retransmission resource for the UE. For a UE in mode2, the UE autonomously selects resource from a resource pool for retransmission. The retransmission resource includes resource for one or more retransmissions. After the UE obtains the retransmission resource, indication information needs to be sent to the receiving UE to indicate the retransmission resource and the number of retransmissions. The indication information may be carried in Sidelink Control Information (SCI).

It should be noted that the retransmission resource may be determined at the initial transmission (retransmission is activated), or determined upon receiving a negative acknowledgement response signal.

The retransmission resource includes: a time domain and a frequency domain, and further includes: a time interval between retransmission and initial transmission, a modulation coding format of the retransmission, the number of retransmissions, and the like.

At step S403, the UE retransmits the V2X data.

The retransmission is carried out according to the reported response information. When the response is "Nack", the V2X data is retransmitted. For groupcast, the receiving terminal includes a plurality of UEs, if only one receiving UE sends the Nack response, the retransmission may adopt a unicast mode or a multicast mode; if more than one receiving UEs send the Nack response, the retransmission may adopt the multicast mode.

In order to reduce waiting delay of the transmitting UE, the time interval between the response signal and the corresponding Physical Sidelink Share Channel (PSSCH) data may be set to a definite value. That is, the transmitting UE waits for a fixed time interval after sending the PSSCH data before detecting reception of the response signal.

The retransmission may be a synchronous non-adaptive retransmission or an asynchronous adaptive retransmission. The synchronous non-adaptive retransmission refers to that the time interval between the retransmission and the initial transmission is fixed, and the retransmission and the initial transmission are performed in the same physical format (such as the same frequency domain resource location, the modulation coding mode and the like). The asynchronous adaptive retransmission refers to that the time interval between the retransmission and the initial transmission is configured, and different physical formats are adopted in the retransmission and the initial transmission. The specific retransmission mode is designated when retransmission is activated, and for asynchronous adaptive retransmission, parameters such as the time interval and the retransmission physical format are set by a gNB or the transmitting UE.

Different scenarios to which the present disclosure is applicable are specifically described below in conjunction with various embodiments.

Figure 5:
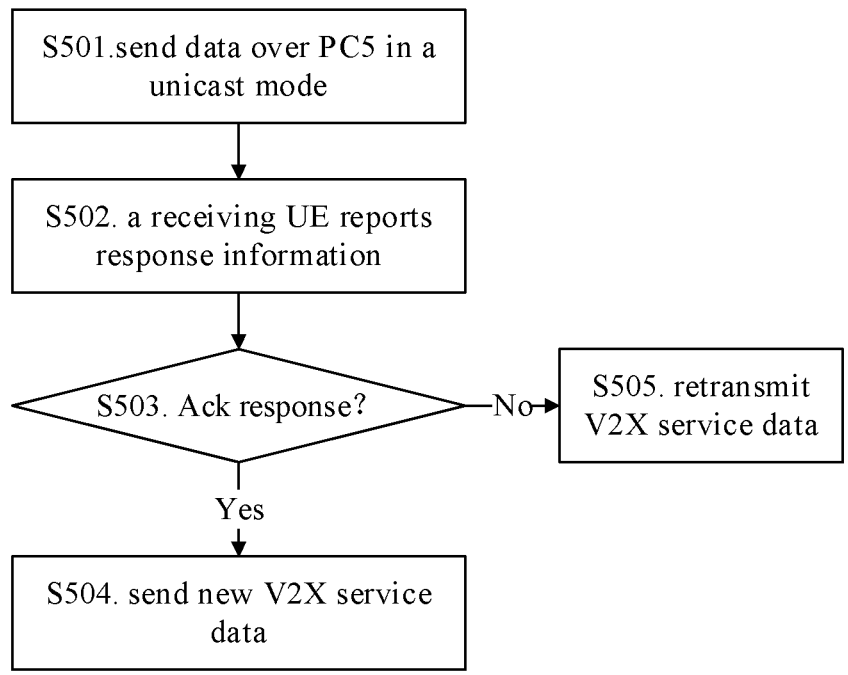
FIGS. 5-11 are flowcharts according to various embodiments of the present disclosure.

FIG. 5 is a schematic flowchart of a method according to an embodiment of the present disclosure. This embodiment provides a method for retransmitting PC5 data in a unicast scenario. As shown in FIG. 5, it mainly includes the following steps S501 to S505.

At step S501, a UE sends V2X service data over PC5 in a unicast mode.

The UE firstly acquires the transmission resource, e.g., by the gNB (mode1) or by autonomous selection (mode2). The UE may acquire the retransmission resource while acquiring the initial transmission resource. The UE is a transmitting UE that establishes a unicast link with a receiving UE, sends V2X service resource indication information to the receiving UE and sends V2X service data on the resource. After acquiring the retransmission resource, the transmitting UE indicates the retransmission resource and the number of retransmissions to the receiving UE.

At step S502, the receiving UE reports the response information.

The receiving UE receives the V2X data according to the indication information from the transmitting UE. If the receiving UE can decode correctly, an "acknowledge" response is reported; otherwise, a "negative acknowledge" response is reported. The reports are sent over the PSFCH channel on the PC5 interface.

At step S503, the transmitting UE determines whether the response is acknowledgement, if so, turn to step S504; otherwise, turn to step S505.

At step S504, the transmitting UE continues to send new V2X data.

Upon receiving an acknowledgement response, the transmitting UE continues to send new V2X data. Before sending the new V2X data, the transmitting UE requests transmission resource for the new V2X data. If the transmitting UE has acquired the retransmission resource, the transmitting UE sends indication information for releasing the retransmission resource, and the indication information may be sent to the gNB (mode1) or broadcasted over PC5.

At step S505, the transmitting UE retransmits the V2X data.

Upon receiving a negative acknowledgement response, the transmitting UE retransmits the V2X data over the PC5 interface. If the transmitting UE has acquired the PC5 retransmission resource, the V2X data is retransmitted on the retransmission resource; otherwise, the transmitting UE firstly acquires the retransmission resource, e.g., through configuration by the gNB (mode1) or by the autonomous selection. Considering that there is generally a delay limit for the V2X service, the number of V2X service retransmissions also needs to be limited. If the number of retransmissions is limited to 3 according to the delay requirement of the V2X service, and the receiving UE still does not receive the service correctly after three retransmissions, the transmitting UE discards the corresponding V2X service. The specific retransmission number limit may be set by an upper layer or may be pre-configured.

Figure 6:
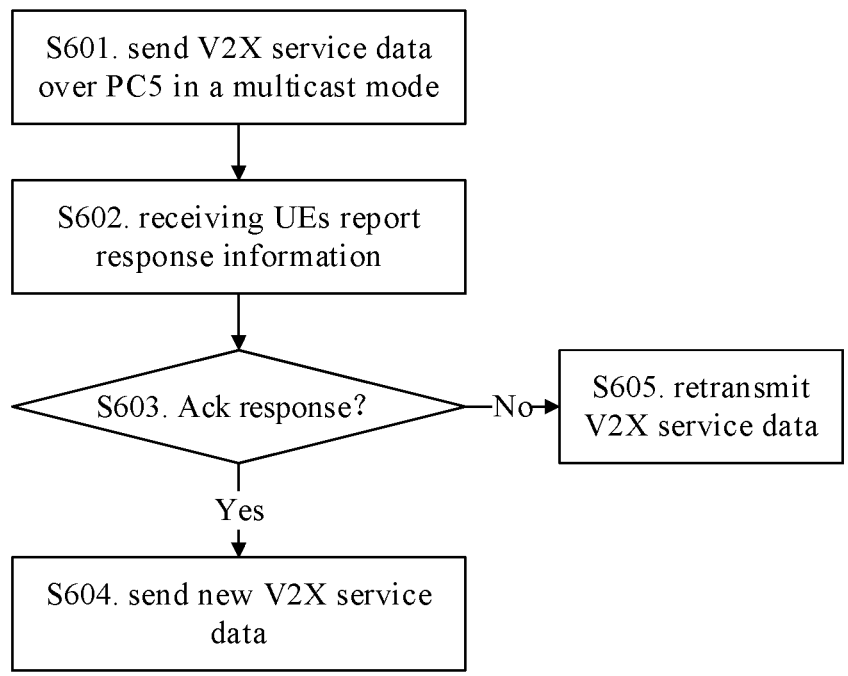

FIG. 6 is a schematic flowchart of a method according to an embodiment of the present disclosure. This embodiment provides a method for retransmitting PC5 data in a multicast scenario. As shown in FIG. 6, it mainly includes the following steps S601 to S605.

At step S601, a transmitting UE sends V2X service data in a multicast mode.

The transmitting UE simultaneously sends V2X service data to a plurality of receiving UEs in a multicast mode. The multicast is similar to broadcast, a plurality of receiving UEs join in a multicast group, the transmitting UE sends V2X service data on a multicast common channel, and only UEs in the multicast group can receive the corresponding V2X service. Similar to unicast retransmission, the transmitting UE may acquire the multicast retransmission resource while acquiring the multicast initial transmission resource.

At step S602, the receiving UEs send response signals.

More than one receiving UEs are provided, considering that the multicast transmission involves the same V2X data, and as long as one receiving UE sends a negative acknowledgement response, the transmitting UE needs to retransmit the V2X data. Generally, the number of Nack signals is less than the number of Ack signals, so only the Nack response signal may be sent, i.e., a receiving UE that correctly receives the V2X data may not send a response signal.

At step S603, the transmitting UE determines whether the response is acknowledgement, if so, turn to step S604; otherwise, turn to step S605.

The transmitting UE receives a negative acknowledgement response signal, which indicates that there is at least one receiving UE does not correctly receive the V2X service, and as long as the transmitting UE receives a negative acknowledgement response signal, detection on reception of other response signals may be stopped.

At step S604, the transmitting UE sends new V2X service data in the multicast mode.

The transmitting UE acquires the multicast resource, informs the receiving UE of the multicast resource, and sends new V2X service data.

At step S605, the transmitting UE retransmits the V2X service data in the multicast mode.

If the transmitting UE has acquired the retransmission resource, the V2X service data is retransmitted on the retransmission resource; otherwise, the transmitting UE acquires the retransmission resource, indicates the retransmission resource to the receiving UEs and sends the V2X service data.

Figure 7:
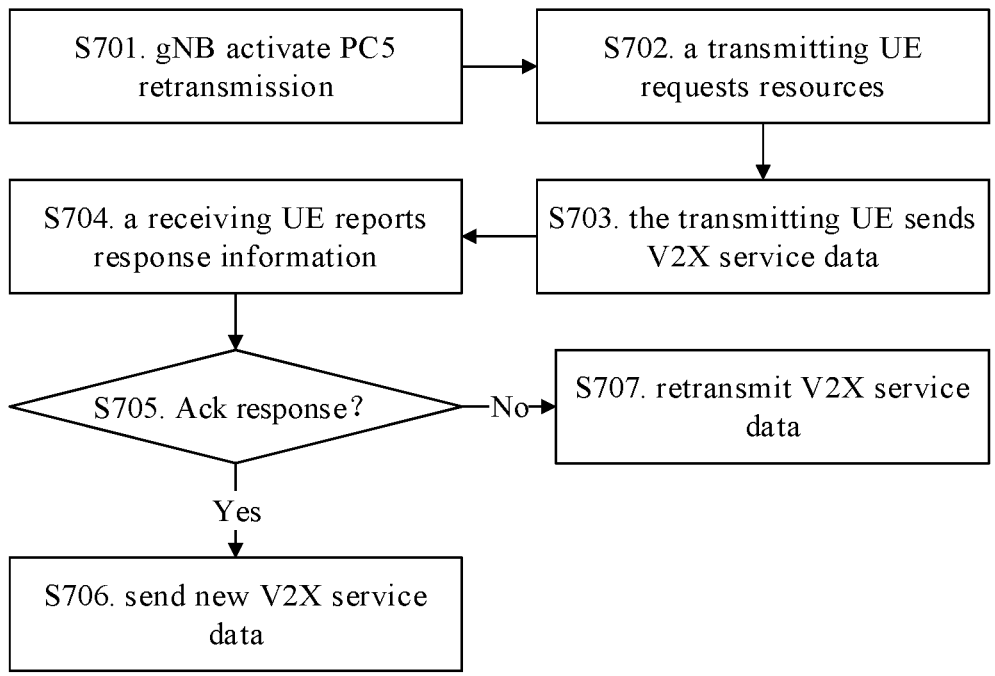

FIG. 7 is a schematic flowchart of a method according to an embodiment of the present disclosure. This embodiment provides a method for simultaneously configuring initial transmission resource and retransmission resource during mode1 transmission. As shown in FIG. 7, it mainly includes the following steps S701 to S707.

At step S701, a gNB indicates activation of PC5 retransmission.

The gNB determines to activate the PC5 retransmission based on at least one of: a UE request, QoS of a V2X service and a PC5 link state. For example, when the UE request the PC5 retransmission, and/or V2X service have high reliability requirements, and/or the PC5 link quality is poor, the gNB determines to activate the PC5 retransmission. The gNB may send the indication through physical layer DCI signaling, MAC CE signaling, or RRC signaling.

At step S702, a transmitting UE requests initial transmission and retransmission resource from the gNB.

The transmitting UE requests the resource from the gNB through RRC signaling, and the gNB indicates resource information to the UE through RRC signaling.

It should be noted that even if the transmitting UE does not request the gNB for the retransmission resource, the gNB may still configure initial transmission resource and retransmission resource at the same time and notify the transmitting UE.

At step S703, the transmitting UE sends initial transmission resource location information and the V2X service data.

The transmitting UE sends the resource location through a Physical Sidelink Control Channel (PSCCH), and sends the V2X data on the resource through a Physical Sidelink shared Channel (PSCCH).

At step S704, a receiving UE sends a response signal. The receiving UE sends a response signal on a Physical Sidelink Feedback Channel (PSFCH).

At step S705, the transmitting UE determines whether the response is acknowledgement, if so, turn to step S706; otherwise, turn to step S707.

At step S706, the transmitting UE continues to send new V2X service data.

Further, the transmitting UE requests the gNB to release the retransmission resource obtained in step S702, which may be then used by the gNB for transmission of other V2X services.

At step S707, the transmitting UE sends retransmission resource location information and retransmits the V2X service data on the retransmission resource.

The transmitting UE has acquired the retransmission resource, sends the retransmission resource location information via PSCCH, and retransmits the V2X service data via PSSCH.

Figure 8:
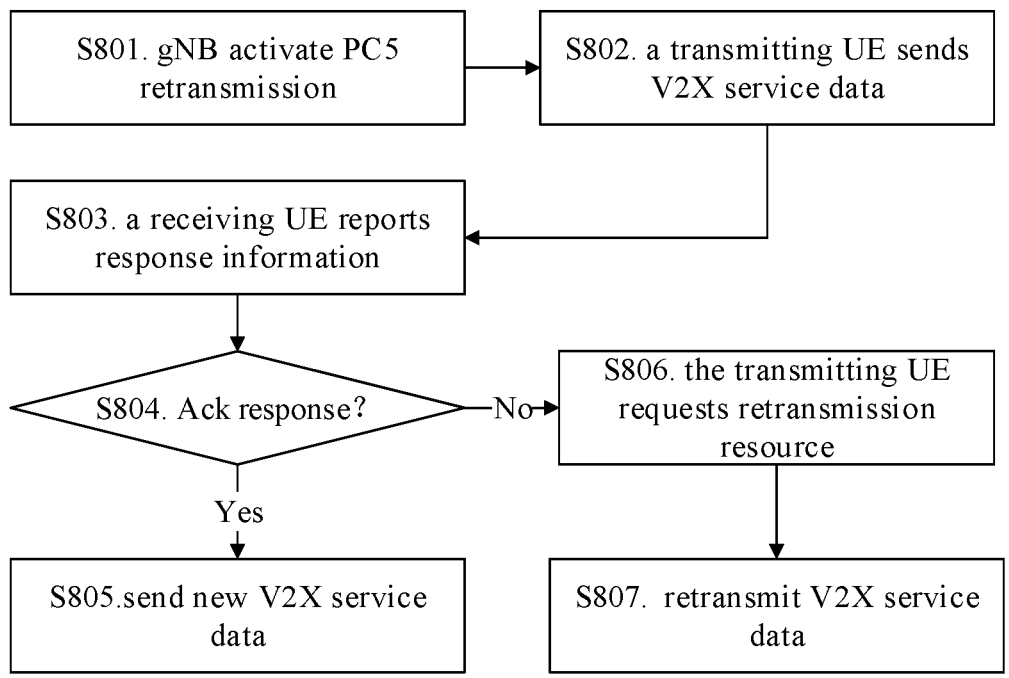

FIG. 8 is a schematic flowchart of a method according to an embodiment of the present disclosure. This embodiment provides a method for configuring retransmission according to the response during mode1 transmission. As shown in FIG. 8, it mainly includes the following steps S801 to S807.

At step S801, a gNB indicates activation of PC5 retransmission.

This step is the same as step S701 described in the above embodiment, and thus is not repeated here.

At step S802, a transmitting UE requests PC5 resource for initial transmission of a V2X service from the gNB, and sends V2X service data on the PC5 resource.

At step S803, a receiving UE sends a response signal.

At step S804, the transmitting UE determines whether the response is acknowledgement, if so, turn to step S805; otherwise, turn to step S806.

At step S805, the transmitting UE continues to send new V2X service data.

The transmitting UE requests sources for sending the V2X service, indicates a location of the sources to the receiving UE, and sends new V2X service data on the resource.

At step S806, the transmitting UE requests retransmission resource from the gNB.

Upon receiving a negative acknowledgement response, the transmitting UE requests retransmission resource from the gNB through RRC signaling, and the gNB indicates information of the retransmission resource through RRC signaling.

At step S807, the transmitting UE sends retransmission resource location information and retransmits the V2X service data on the retransmission resource. The retransmission resource location information further includes the number of retransmissions. The transmitting UE indicates the retransmission resource location information to the receiving UE via PSCCH, and retransmits the V2X service data via PSSCH.

Figure 9:
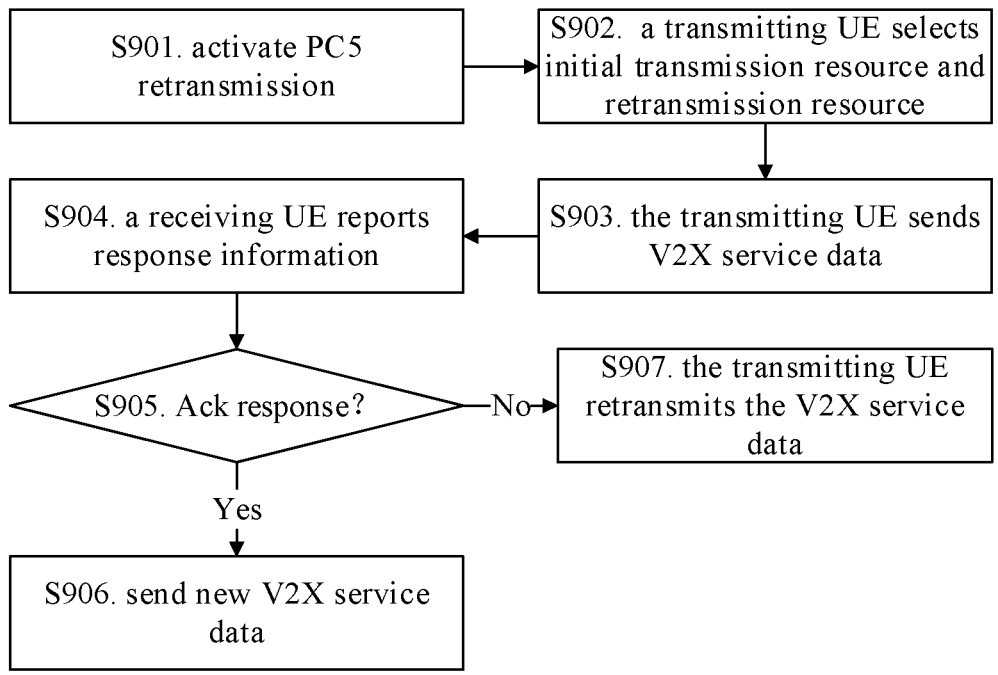

FIG. 9 is a schematic flowchart of a method according to an embodiment of the present disclosure. This embodiment provides a method for simultaneously selecting initial transmission resource and retransmission resource during mode2 transmission. As shown in FIG. 9, it mainly includes the following steps S901 to S907.

At step S901, PC5 retransmission is activated.

For an in-coverage (at least a transmitting UE is in coverage) scenario, similar to step S701/S801, a gNB determines to activate the PC5 retransmission. For an out-of-coverage scenario, the transmitting UE determines to activate the PC5 retransmission, and determines whether to activate the PC5 retransmission according to V2X service QoS requirement and/or PC5 link state.

At step S902, a transmitting UE selects initial transmission resource and retransmission resource.

At step S903, the transmitting UE indicates location information of the initial transmission resource location information and retransmission resource location information, and sends V2X service data on the initial transmission resource. The retransmission resource location information further includes the number of retransmissions.

At step S904, a receiving UE sends a response signal.

At step S905, the transmitting UE determines whether the response is acknowledgement, if so, turn to step S906; otherwise, turn to step S907.

At step S906, the transmitting UE continues to send new V2X data.

In an embodiment, the transmitting UE instructs to release the retransmission resource. The transmitting UE broadcasts an instruction to release the retransmission resource at PC5, or instructs the gNB to release the retransmission resource.

At step S907, the transmitting UE retransmits the V2X data.

Figure 10:
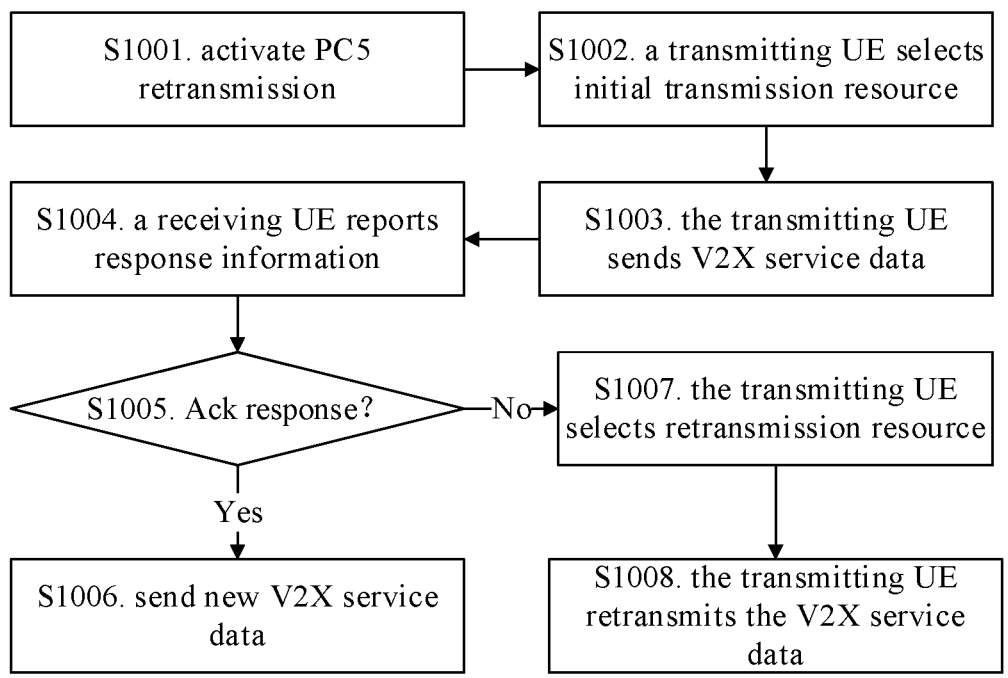

FIG. 10 is a schematic flowchart of a method according to an embodiment of the present disclosure. This embodiment provides a method for selecting retransmission resource after a transmitting UE receives a Nack response signal during mode2 transmission. As shown in FIG. 10, it mainly includes the following steps S1001 to S1008.

At step S1001, PC5 retransmission is activated. This step is the same as step S901 described in the above step embodiment, and thus is not repeated.

At step S1002, a transmitting UE selects initial transmission resource.

At step S1003, the transmitting UE indicates initial transmission resource location information, and sends V2X service data on the initial transmission resource.

At step S1004, a receiving UE sends a response signal.

At step S1005, the transmitting UE determines whether the response is acknowledgement, if so, turn to step S1006; otherwise, turn to step S1007.

At step S1006, the transmitting UE continues to send new V2X data.

At step S1007, the transmitting UE selects retransmission resource.

At step S1008, the transmitting UE indicates a location of the retransmission resource, and retransmits the V2X service on the retransmission resource.

Figure 11:
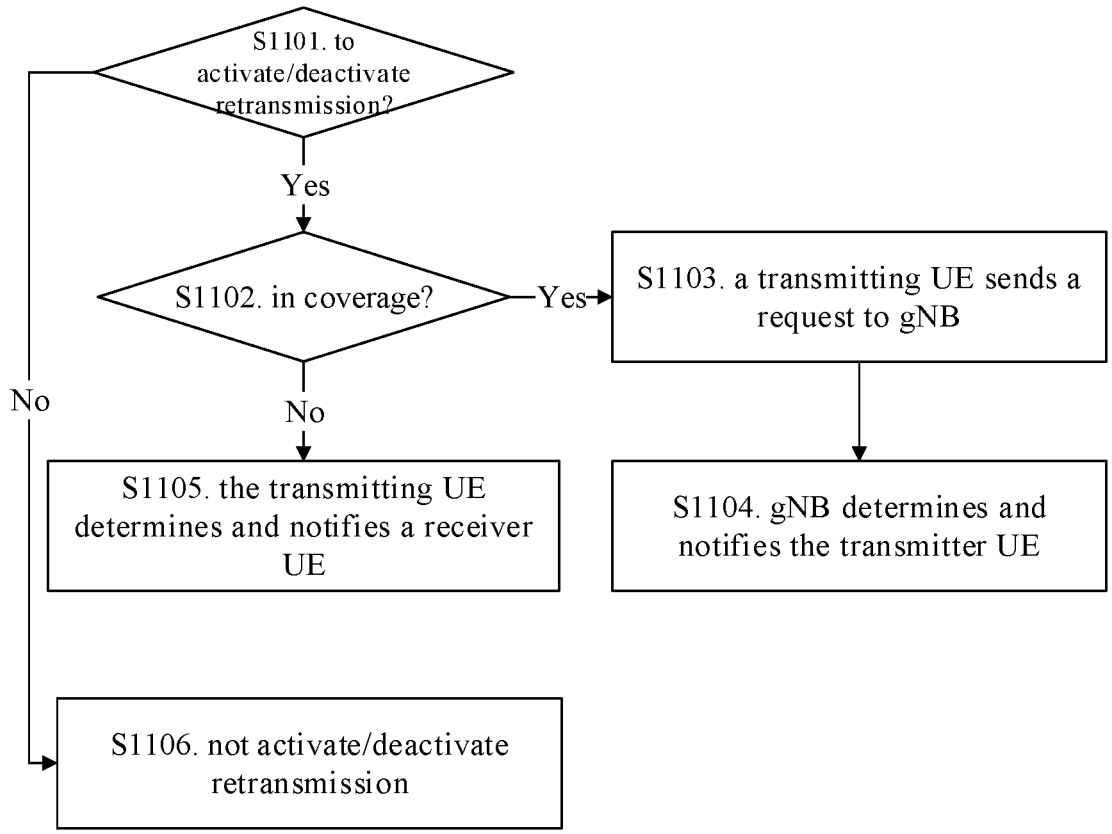

FIG. 11 is a schematic flowchart of a method according to an embodiment of the present disclosure. This embodiment provides a method for activating/deactivating PC5 retransmission. As shown in FIG. 11, it mainly includes the following steps S1101 to S1106.

At step S1101, a UE judges whether to activate/deactivate PC5 retransmission, and if the PC5 retransmission is to be activated/deactivated, turn to step S1102; otherwise, turn to step S1106.

The UE determines whether to activate/deactivate the PC5 retransmission according to at least one of QoS requirement of V2X service to be sent, PC5 link state and PC5 retransmission state. The PC5 retransmission state includes activated or inactivated. If the PC5 retransmission is activated, it may remain activated or may be deactivated; and if the PC5 retransmission is inactivated, it may be activated or remain inactivated. That is, it is determined in step S1101 whether to change the PC5 retransmission state.

At step S1102, the UE determines whether it is in coverage, and if so, turn to step S1103; otherwise, turn to step S1105.

At step S1103, the UE sends a PC5 retransmission activate/deactivate request to a gNB. That is, the UE sends a request to the gNB to change the PC5 retransmission state.

At step S1104, the gNB determines to activate/deactivate the retransmission and notifies the UE.

When a transmitting UE is in coverage, the gNB determines to activate/deactivate the PC5 retransmission.

At step S1105, the UE activates/deactivates the retransmission and notifies a receiving UE. That is, the UE autonomously changes the PC5 retransmission state.

When the transmitting UE is out of coverage, the transmitting UE determines to activate/deactivate the PC5 retransmission.

At step S1106, the UE continues to send the V2X service using the existing transmission mode. If the UE determines in step S1101 that there is no need to activate/deactivate the PC5 retransmission (i.e., no need to change the PC5 retransmission state), the V2X service continues to be sent in the existing manner. That is, if the PC5 retransmission has already been activated, the PC5 retransmission continues, and if the PC5 retransmission has not been activated yet, the PC5 retransmission is not activated.

Through the description of the above implementations, those skilled in the art can clearly understand that the method according to the above embodiments may be implemented by means of software plus a necessary general hardware platform. Obviously, it may also be implemented by hardware, but in most cases, the former is preferable. Based on such understanding, the technical solutions of the present disclosure essentially or, in other words, a part thereof contributing to the prior art, can be embodied in a form of a software product, wherein the software product is stored in a storage medium (such as an ROM/RAM, a disk, or an optical disc) and includes a number of instructions to make a terminal device (which may be a mobile phone, a computer, a server, or a network device, etc.) to execute the methods of the various embodiments of the present disclosure.

In an embodiment, there is further provided an information transmission apparatus configured to implement the above embodiments and implementations. Details which have been explained will not be repeated here. As used herein, the term "module" may be a combination of software and/or hardware that can realize a preset function. The apparatus described in the following embodiments is preferably implemented in software, but hardware, or a combination of software and hardware, is also possible and contemplated.

Figure 12:
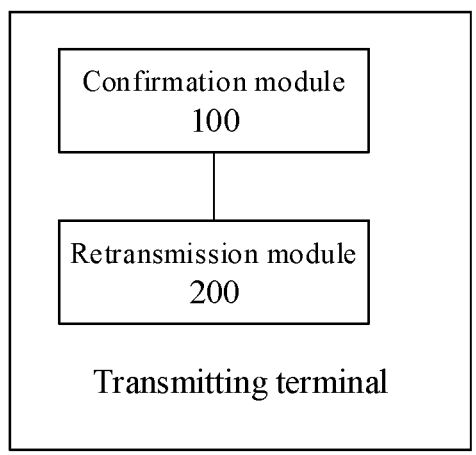
FIG. 12 is a block diagram of modules in an information transmission apparatus according to the present disclosure.

FIG. 12 is a block diagram of an information transmission apparatus according to an embodiment of the present disclosure. The information transmission apparatus is a transmitting terminal or is located in a transmitting terminal. As shown in FIG. 12, the apparatus includes a confirmation module 100 and a retransmission module 200.

The confirmation module 100 is configured to confirm activation/deactivation of PC5 HARQ retransmission. The retransmission module 200 is configured to retransmit, according to negative acknowledgement response information from a receiving terminal, V2X service data to the receiving terminal over PC5.

It should be noted that each of the above modules may be implemented by software or hardware. For the latter, it may be implemented by, but are not limited to: the above modules all located in the same processor; or the above modules each located in different processors in any combination.

Figure 13:
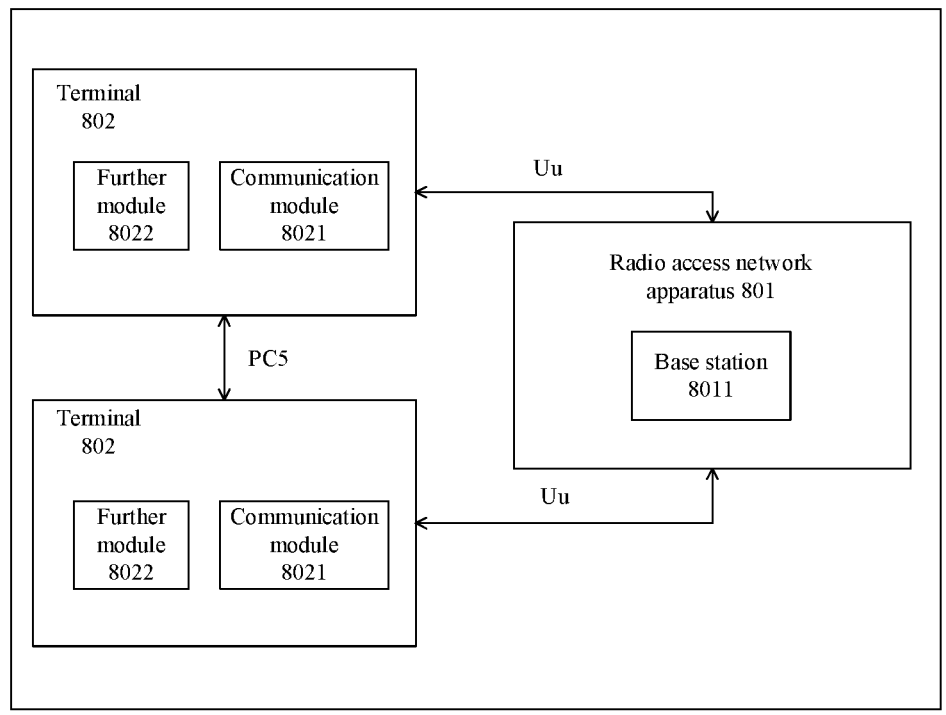
FIG. 13 is a schematic structural diagram of a system according to an embodiment of the present disclosure.

An embodiment of the present disclosure further provides a system for transmitting a response signal. As shown in FIG. 13, the system of the embodiment includes a radio access network apparatus 801 and a terminal 802. In this embodiment, the functional division of the modules is different from the previous embodiments.

The radio access network apparatus 801 includes a base station 8011. The terminal 802 includes a communication module 8021 and a further module 8022. The communication module 8021 is configured to receive retransmission indication information sent from the base station 8011 or pre-configured by the further module 8022, and is further configured to receive V2X service data through initial transmission or retransmission. The communication module 8021 of the terminal 802 is further configured to determine activation/deactivation of retransmission, determine retransmission resource, and determine a response signal. The communication module 8021 of the terminal 802 is further configured to send a response signal, send indication information on activation/deactivation of retransmission, send location information of the initial transmission resource location information and retransmission resource location information, and send V2X service data in the initial transmission and retransmission. The further module 8022 includes: a power module, a radio frequency module, a baseband module, a display module, an audio/video module, a navigation module, a storage module, etc. for implementing functions related to V2X communication. The base station 8011 is configured to send resource configuration information to the terminal 802 in mode1, and receive information reported by the UE.

An embodiment of the present disclosure further provides a storage medium having a computer program stored thereon. The computer program, when executed by a processor, causes the processor to perform the information transmission method according to various embodiments of the present disclosure.

Optionally, in this embodiment, the storage medium may include, but is not limited to: a U disk, a read-only memory (ROM), a random access memory (RAM), a mobile hard disk, a disk or optical disk, and other media that can store a computer program.

An embodiment of the present disclosure further provides an electronic apparatus, including a memory and a processor. The memory has a computer program stored thereon, and the processor, when executing the computer program, performs the information transmission method according to various embodiments of the present disclosure.

According to the embodiments of the present disclosure, a design for V2X service data retransmission is implemented, the requirements for PC5 retransmission are satisfied under different V2X service QoS requirements and PC5 link states, reliability of the V2X service is improved, and effective utilization of the PC5 resource is further ensured.

Obviously, a person skilled in the art would understand that the above modules and steps of the present disclosure can be realized by using a universal computing device, can be integrated in a single computing device or distributed on a network that consists of a plurality of computing devices; and alternatively, they can be realized by using the executable program code of the computing device, so that they can be stored in a storage device and executed by the computing device, in some cases, can perform the shown or described steps in a sequence other than herein, or they are made into various integrated circuit modules respectively, or a plurality of modules or steps thereof are made into a single integrated circuit module, thus to be realized. In this way, the present disclosure is not restricted to any particular hardware and software combination.

The descriptions above are only embodiments of the present disclosure, which are not used to restrict the present disclosure. For those skilled in the art, the present disclosure may have various changes and variations. Any modification, equivalent replacement, improvement and the like made within the principle of the present disclosure should be included in the protection scope of the present disclosure.

What is claimed is:

1. An information transmission method, comprising:
   confirming, by a transmitting terminal, activation/deactivation of PC5 Hybrid Automatic Repeat reQuest (HARQ) retransmission; and
   retransmitting, by the transmitting terminal according to negative acknowledgement response information from a receiving terminal, Vehicle to Everything (V2X) service data to the receiving terminal over PC5.

2. The method according to claim 1, wherein the step of confirming, by the transmitting terminal, activation/deactivation of PC5 HARQ retransmission comprises:
   determining, by the transmitting terminal, whether to activate/deactivate the PC5 HARQ retransmission according to at least one of: a V2X service attribute, a PC5 link state, and a retransmission activation state.

3. The method according to claim 1, wherein the step of confirming, by the transmitting terminal, activation/deactivation of PC5 HARQ retransmission comprises:
   sending, by the transmitting terminal, indication information to a base station, the indication information comprising at least one of: a V2X service attribute, a PC5 link state, and a retransmission activation state;
   configuring, by the base station according to the indication information, activation/deactivation of the PC5 HARQ retransmission for the transmitting terminal; and
   indicating, by the transmitting terminal according to the information configured by the base station, an activated state of the PC5 retransmission to the receiving terminal.

4. The method according to claim 1, wherein before retransmitting, by the transmitting terminal, V2X service data to the receiving terminal, the method further comprises:
   sending, by the transmitting terminal, V2X service data to the receiving terminal; and
   receiving, by the transmitting terminal on a Physical Sidelink Feedback Channel (PSFCH), response information sent from the receiving terminal.

5. The method according to claim 1, wherein the step of confirming, by the transmitting terminal, activation/deactivation of PC5 HARQ retransmission comprises:
   indicating, in response to the transmitting terminal confirming activation of the PC5 retransmission, configuration information of PC5 retransmission resource while initially sending resource configuration information of the V2X service data to the receiving terminal.

6. The method according to claim 1, wherein before retransmitting, by the transmitting terminal, V2X service data to the receiving terminal, the method further comprises:
   determining, by the transmitting terminal, configuration information of PC5 retransmission resource for retransmitting V2X service data; and
   sending, by the transmitting terminal after determining the configuration information of the PC5 retransmission resource, retransmission resource indication information to the receiving terminal, wherein the retransmission resource indication information comprises retransmission resource and the number of retransmissions.

7. The method according to claim 6, wherein the step of determining, by the transmitting terminal, the PC5 retransmission resource comprises:
   requesting, by transmitting terminal, the PC5 retransmission resource from a base station, and configuring, by the base station, the PC5 retransmission resources for the transmitting terminal.

8. The method according to claim 6, wherein the retransmission resource comprises: a retransmission time domain, a retransmission frequency domain, a time interval between retransmission and initial transmission, and a modulation coding format of retransmission.

9. The method according to claim 1, wherein the transmitting terminal retransmits the V2X service data to the receiving terminal over PC5 by asynchronous adaptive retransmission or synchronous non-adaptive retransmission.

10. The method according to claim 1, wherein the transmitting terminal or the receiving terminal comprises one of: an On Board Unit (OBU), a Road Side Unit (RSU), a User Equipment (UE), a Vehicle-UE, a Pedestrian-UE, a wearable device, a UE-to-network relay, and an Internet of Things/Manual Toll Collection (IoT/MTC) terminal.

11. The method according to claim 1, wherein the receiving terminal comprises a plurality of receiving terminals, and the transmitting terminal retransmits the V2X service data to the plurality of receiving terminals through multicast or broadcast.

12. A non-transitory storage medium storing a computer program thereon, wherein the computer program, when executed by a processor, causes the processor to perform the method according to claim 1.

13. An electronic apparatus, comprising a memory and a processor, wherein the memory has a computer program stored thereon, and the processor, when executing the computer program, executes the method according to claim 1.

14. The method according to claim 6, wherein the step of determining, by the transmitting terminal, the PC5 retransmission resource comprises:
   selecting, by the transmitting terminal, the PC5 retransmission resource from a configuration resource pool.

* * * * *